March 28, 1950     A. G. FORSYTH     2,502,002
VARIABLE PITCH PROPELLER
Filed Aug. 24, 1944     2 Sheets-Sheet 1
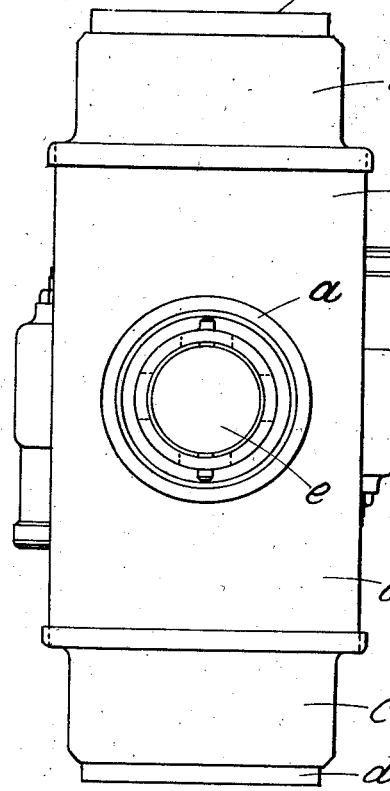
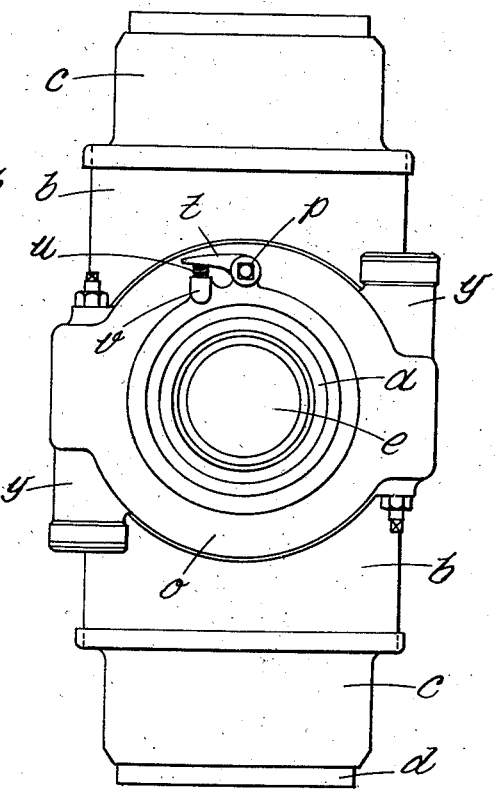
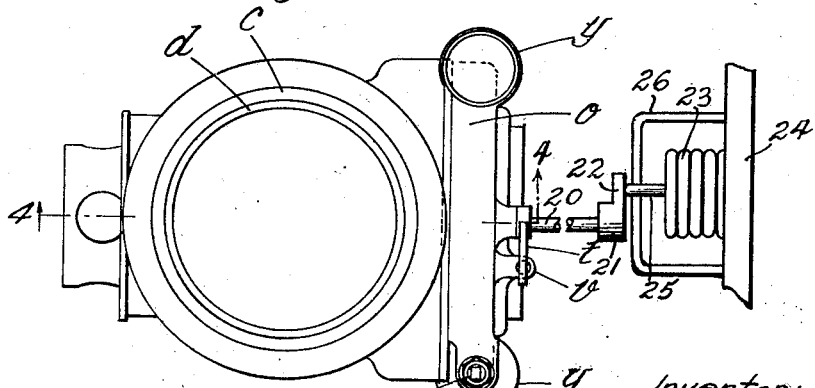
Inventor:
Archibald Graham Forsyth,
By Atty. Roberts B Pearson March 28, 1950  A. G. FORSYTH  2,502,002
VARIABLE PITCH PROPELLER
Filed Aug. 24, 1944  2 Sheets-Sheet 2
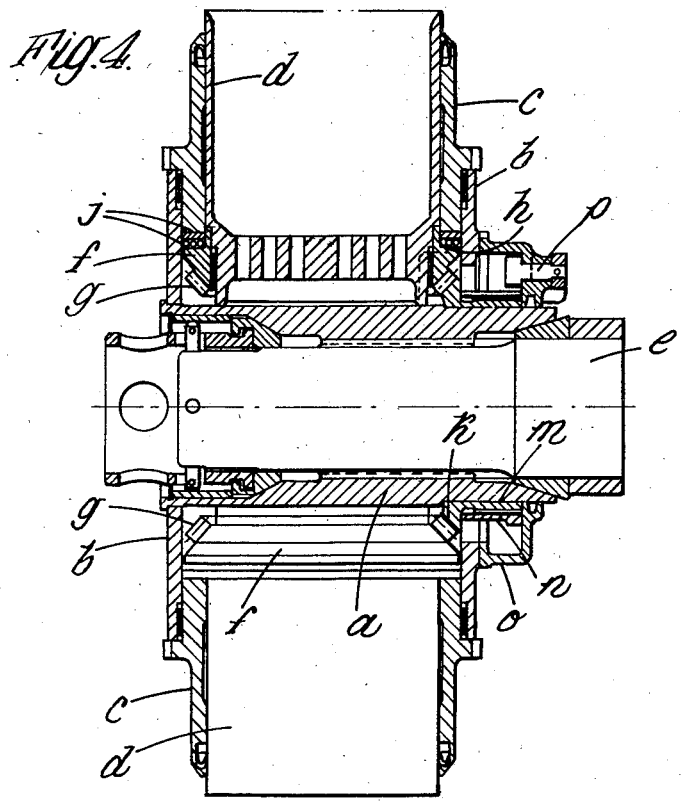
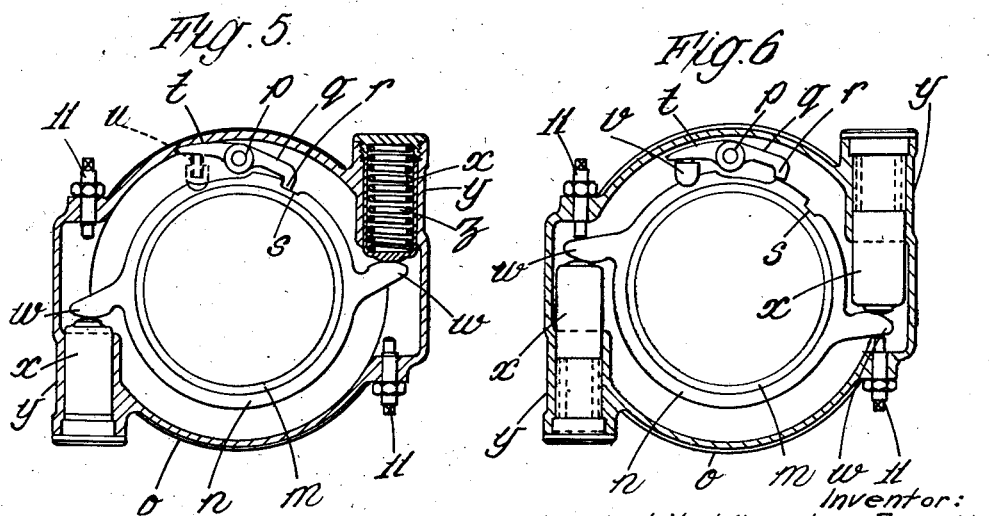
Inventor:
Archibald Graham Forsyth,
By
Atty. Roberts B Carson Patented Mar. 28, 1950

2,502,002

UNITED STATES PATENT OFFICE 2,502,002

VARIABLE PITCH PROPELLER

Archibald Graham Forsyth, Cheam, England

Application August 24, 1944, Serial No. 550,992
In Great Britain June 20, 1944

4 Claims. (Cl. 170—160.13)

This invention relates to a variable pitch propeller which, on account of the cheapness with which it may be produced, makes it eminently suitable for use on pilotless aircraft which are not likely to be used more than once.

In the usual types of variable pitch propellers means have to be provided to enable the pilot to vary the pitch at will, an operation which may take place several times during a single flight, moreover such a propeller would, normally, be used repeatedly. In these circumstances the means for effecting pitch variation are sometimes elaborate and consequently costly to produce. The situation is different however in the case of a pilotless aircraft which is not likely to be used more than once. In such a case it will suffice for the propeller blades to be set at one pitch for the take off or launching and to be varied to another pitch approximately at a predetermined part of the flight, e. g. at a predetermined altitude.

To enable this to be done, and in accordance with the present invention, the blades of a propeller are set and held initially at a predetermined pitch against spring action and means are provided whereby, when so required, the spring action may be released in order to turn the blades about their individual axes to a second predetermined pitch.

For this purpose the blades may be rotatably mounted in sockets in a rotatable hub and connected by bevel gearing with a spring influenced sleeve furnished with a detent whereby it may be held cocked against, or released to, the spring action. The spring action may be exerted on the sleeve by spring influenced plungers slidable in sockets formed in the hub structure and tangentially disposed with respect to the sleeve, said plungers being arranged to act on lugs projecting from the sleeve. The detent may consist of a spring influenced lever having a nose which may be engaged in a notch in the sleeve when the plungers are forced back in their sockets and having a tail operable from outside the hub structure by radio, barometrically or other conveniently actuated means.

In the accompanying drawings, Figure 1 is a front elevation of a propeller hub arranged in accordance with one form of this invention; Figures 2 and 3 are a rear elevation and a plan thereof, respectively; Figure 4 is a sectional elevation mainly on the line 4—4, Figure 3; and Figures 5 and 6 are sectional rear views showing parts of the pitch changing mechanism in two different positions.

As illustrated, $a$ is a propeller hub in which are secured two oppositely arranged sockets $bc$, $bc$ for the reception of the roots $dd$ of propeller blades (not shown), the parts $bb$ of the sockets being integral with one another and secured to the hub $a$ as shown in Figure 1, and the parts $cc$ fitting into, and being secured in, the parts $bb$. The mounting of the hub $a$ on a propeller shaft $e$ does not form any part of the invention and need not be described. The blade roots $dd$ have secured around their inner ends rings $ff$ formed with bevel gear teeth $g$ and with a shoulder as at $h$. After the blade roots $dd$ have had the parts $cc$ slidden thereonto, the rings $ff$ are secured to said roots and the assemblages are introduced into the parts $bb$ of the sockets, balls $j$ ... are then disposed loosely on the shoulders $h$ and the parts $cc$ are secured to the parts $bb$. Rotatable about the hub $a$ is a bevel wheel $k$ integral with a sleeve $m$ on which is splined a second sleeve $n$, the sleeves $m$ and $n$ extending rearwardly into a housing $o$ secured to the parts $bb$ of the sockets and thus forming a part of the hub structure. In the rear wall of the housing $o$ a bearing is formed for a spindle $p$ on the inner end of which is mounted an arm $q$ having a nose $r$ to engage in a notch $s$ in the periphery of the outer end of the sleeve $n$ and at the outer end of the spindle $p$ is mounted a tail $t$ against which abuts one end of a spring $u$ the other end of which is seated in a socket $v$ on the outside of the housing $o$ the arm $q$ and the tail $t$ together constituting a detent lever on the spindle $p$.

On the sleeve $n$ are two diametrically opposed radially extending lugs $ww$ which lie in the paths of plungers $xx$ slidable in sockets $yy$ on the housing $o$ under the influence of springs such as $z$, the axes of the sockets $yy$ being tangential to a circle concentric with the sleeve $n$.

The arrangement is such that when a propeller blade has been mounted in position it is turned about its individual axis so as to rotate the sleeve $n$ and force back the plungers $x$ until the nose $r$ engages in the notch $s$, as shown in Figure 5.

It is to be understood that the setting of a blade on the hub is such that when the blade has been turned as just described and the nose $r$ engages in the notch $s$ the pitch of the blade will be that required initially, e. g. for the take off or launching. When it is desired to vary the pitch of the blades the tail $t$ is moved against the action of its spring $u$ (by means not shown) so as to lift the nose $r$ out of the notch $s$ and permit the spring urged plungers $xx$ to act on the lugs $ww$ to turn the sleeve $n$, as indicated in Figure 6, the extent of such movement being limited by adjustable stops such as 11. Hence, through the sleeve $m$, the bevel wheel $k$, the bevel teeth $g$ the blade roots $dd$ are turned to effect the required pitch variation.

The means for acting on the tail $t$ may consist of a shaft 20 extending from the rotatable shaft on which the tail $t$ is mounted, the shaft 20 (Fig. 3) being provided with a lug 21 carrying a laterally extending pin 22. A barometric capsule 23, suitably supported by a member 24, carries a stud 25. The barometric capsule 23 is designed to actuate at the proper time to move the stud 25 into the path of the pin 22, as the latter, together with shaft 20, are carried around by the rotating hub structure, thus causing the shaft 20 to turn and actuating the tail $t$. The stud 25 may be guided by a bracket 26 or the like secured to the member 24.

Other suitable mechanism for acting on the tail $t$ may be employed, such as, for example, mechanism actuated by radio controlled means.

I claim:

1. Pitch changing mechanism for varying the pitch of propeller blades comprising, in combination, a plurality of propeller blades and a hub therefor, a drive shaft for said propeller blades, a first bevel gear disposed on the blade root of each of said propeller blades, a sleeve coaxially and freely mounted on said drive shaft, a second bevel gear secured to said sleeve and meshing with said first bevel gears, a plurality of lugs disposed about the periphery of said sleeve, a plurality of spring operated plungers tangentially mounted with respect to said sleeve, said plungers engaging said lugs and constantly urging said lugs for radial movement about the axis of said drive shaft, detent means cooperating with said sleeve to prevent said sleeve from rotating under the influence of said plungers, and means for releasing said detent means under predetermined conditions, whereby said sleeve will rotate under the influence of said plungers and the pitch of the propeller blades will be changed.

2. Pitch changing mechanism for varying the pitch of propeller blades comprising, in combination, a plurality of propeller blades, a hub member for said blades, a drive shaft for driving said blades, a first bevel gear fixedly mounted on the root of each of said blades, a sleeve coaxially and freely mounted on said drive shaft, a second bevel wheel rigidly secured to said sleeve and meshed with said first bevel gears, a plurality of lugs formed on the periphery of said sleeve, a plurality of sockets formed in said hub member, a resiliently mounted plunger slidably mounted in each of said sockets, one end of each of said plungers bearing against one of said lugs thereby tending to rotate said sleeve, a lever pivotally mounted on said hub member, a notch formed in said sleeve and adapted to receive one end of said lever whereby said sleeve may be held against rotation by said plungers, and means for tripping said lever under predetermined conditions to disengage the end of the lever from said notch, whereby said sleeve may be rotated under action by said plungers to change the pitch of the propeller blades.

3. Pitch changing mechanism for varying the pitch of propeller blades as defined in claim 2, and resilient means mounted on said hub member, said resilient means biasing the other end of said lever to urge said first end, constantly, into engagement with said sleeve.

4. Pitch changing mechanism for varying the pitch of propeller blades as defined in claim 2, said second bevel gear being coaxially mounted with respect to said drive shaft.

ARCHIBALD GRAHAM FORSYTH.

REFERENCES CITED

The following references are of record in the file of this patent:

UNITED STATES PATENTS

| Number | Name | Date |
|---|---|---|
| Re. 21,108 | Zipay | May 30, 1939 |
| 1,833,843 | Lemparmentier | Nov. 24, 1931 |
| 1,844,227 | Patriarche | Feb. 9, 1932 |
| 1,903,628 | Landrum | Apr. 11, 1933 |
| 1,920,674 | Barbarou | Aug. 1, 1933 |
| 1,955,688 | Seppeler | Apr. 17, 1934 |
| 1,977,031 | Zipay | Oct. 16, 1934 |
| 1,987,650 | Wiegand | Jan. 15, 1935 |
| 2,010,640 | Michl | Aug. 6, 1935 |
| 2,028,463 | McDougall | Jan. 21, 1936 |

FOREIGN PATENTS

| Number | Country | Date |
|---|---|---|
| 36,986 | Netherlands | July 15, 1935 |
| 458,001 | Great Britain | Dec. 10, 1936 |